(12) United States Patent
Drapala et al.

(10) Patent No.: US 9,678,873 B2
(45) Date of Patent: Jun. 13, 2017

(54) EARLY SHARED RESOURCE RELEASE IN SYMMETRIC MULTIPROCESSING COMPUTER SYSTEMS

(71) Applicant: International Business Machines Corporation, Armonk, NY (US)

(72) Inventors: Garrett M. Drapala, Cary, NC (US); Vesselina K. Papazova, Highland, NY (US); Robert J. Sonnelitter, III, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 176 days.

(21) Appl. No.: 14/621,460

(22) Filed: Feb. 13, 2015

(65) Prior Publication Data
US 2016/0239418 A1    Aug. 18, 2016

(51) Int. Cl.
*G06F 12/08* (2016.01)
*G06F 12/0831* (2016.01)
(Continued)

(52) U.S. Cl.
CPC ........ *G06F 12/0833* (2013.01); *G06F 12/084* (2013.01); *G06F 12/0811* (2013.01);
(Continued)

(58) Field of Classification Search
CPC ............. G06F 12/0811; G06F 12/0813; G06F 12/0831; G06F 12/0833; G06F 12/084;
(Continued)

(56) References Cited

U.S. PATENT DOCUMENTS 6,098,156 A  *  8/2000  Lenk ................... G06F 12/0831
                                                                711/121
6,877,030 B2   4/2005  Deneroff
(Continued)

FOREIGN PATENT DOCUMENTS

CN           103150264 A        6/2013

OTHER PUBLICATIONS

Deanna Postles Dunn Berger et al., pending U.S. Appl. No. 14/621,454 entitled "Position-Based Replacement Policy for Address Synonym Management in Shared Caches," filed Feb. 13, 2015.
(Continued)

*Primary Examiner* — Gary Portka
(74) *Attorney, Agent, or Firm* — Cantor Colburn LLP; Margaret A. McNamara

(57) ABSTRACT

In one embodiment, a computer-implemented method includes detecting a cache miss for a cache line. A resource is reserved on each of one or more remote computing nodes, responsive to the cache miss. A request for a state of the cache line on the one or more remote computing nodes is broadcast to the one or more remote computing nodes, responsive to the cache miss. A resource credit is received from a first remote computing node of the one or more remote computing nodes, responsive to the request. The resource credit indicates that the first remote computing node will not participate in completing the request. The resource on the first remote computing node is released, responsive to receiving the resource credit from the first remote computing node.

15 Claims, 3 Drawing Sheets

(51) Int. Cl.
    *G06F 12/0811* (2016.01)
    *G06F 12/0813* (2016.01)
    *G06F 12/084* (2016.01)

(52) U.S. Cl.
    CPC .. *G06F 12/0813* (2013.01); *G06F 2212/1021* (2013.01); *G06F 2212/1024* (2013.01); *G06F 2212/621* (2013.01)

(58) Field of Classification Search
    CPC ..... G06F 2212/1021; G06F 2212/1024; G06F 2212/62; G06F 2212/621
    USPC .......................................... 711/124, 141, 146
    See application file for complete search history.

(56) References Cited

U.S. PATENT DOCUMENTS

| | | | |
|---|---|---|---|
| 6,973,544 B2 | 12/2005 | Berg et al. | |
| 8,510,512 B2 | 8/2013 | Ganfield et al. | |
| 9,405,687 B2* | 8/2016 | Fahim | G06F 12/0813 |
| 2005/0193177 A1 | 9/2005 | Moga et al. | |
| 2011/0320738 A1* | 12/2011 | Blake | G06F 12/0831 |
| | | | 711/141 |
| 2012/0102572 A1 | 4/2012 | Murakami et al. | |
| 2014/0032853 A1 | 1/2014 | Lih et al. | |

OTHER PUBLICATIONS

Disclosed anonymously(Mar. 2009). Method and Apparatus for Cooperative State Prefetching in Clustered Shared Memory Multi-processor Systems with Region Coherence Arrays. IPCOM000180817D, 7 pgs.

Garrett M. Drapala et al., pending U.S. Appl. No. 14/621,467 entitled "Dynamic Synchronous to Asynchronous Frequency Transitions in High-Performance Symmetric Multiprocessing," filed Feb. 13, 2015.

List of IBM Patents or Patent Applications Treated as Related, 2 pgs.

* cited by examiner

EARLY SHARED RESOURCE RELEASE IN SYMMETRIC MULTIPROCESSING COMPUTER SYSTEMS

BACKGROUND

Various embodiments of this disclosure relate to symmetric multiprocessing (SMP) computer systems and, more particularly, to early shared resource release in SMP computer systems.

An SMP computer system may include multiple computing nodes. Within each computing node, multiple processors may be connected to a main memory for the computing node. Each processor may have its own local cache, such as an L1 cache, but the processors within a computing node may also share a cache, such as an L2 cache. Some SMP computer systems have cache coherence across all computing nodes, such that the caches of the various computing nodes maintain consistent data. To achieve this type of cache coherence, the SMP computer system operates a protocol to ensure that the data remains consistent. A benefit of cache coherence is that a main memory access may be avoidable by a computing node when that computing node experiences a cache miss when seeking a cache line in the L2 cache. In that case, the computing node may request the cache line from the other computing nodes, which may retrieve it from their own caches without a main memory access.

More specifically, when a first computing node experiences a cache miss, it broadcasts to the other computing nodes a request for the desired cache line. In response to that request, the other computing nodes expend resources handling the request. For example, each other computing node may check one or more of its own caches to determine the current state of the cache line in question. The other computing nodes then broadcast the current state of the cache line, and in response to receiving the states of the cache line at other computing nodes, each computing node updates its cache line as needed.

SUMMARY

In one embodiment of this disclosure, a computer-implemented method includes detecting a cache miss for a cache line. A resource is reserved on each of one or more remote computing nodes, responsive to the cache miss. A request for a state of the cache line on the one or more remote computing nodes is broadcast to the one or more remote computing nodes, responsive to the cache miss. A resource credit is received from a first remote computing node of the one or more remote computing nodes, responsive to the request. The resource credit indicates that the first remote computing node will not participate in completing the request. The resource on the first remote computing node is released, responsive to receiving the resource credit from the first remote computing node.

In another embodiment, a system includes a cache controller and one or more processors. The cache controller is in communication with one or more remote computing nodes. The one or more processors are coupled to the cache controller and configured to detect a cache miss for a cache line. The one or more processors are configured to reserve a resource on each of the one or more remote computing nodes, responsive to the cache miss. The one or more processors are further configured to broadcast to the one or more remote computing nodes a request for a state of the cache line on the one or more remote computing nodes, responsive to the cache miss. The one or more processors are further configured to receive a resource credit from a first remote computing node of the one or more remote computing nodes, responsive to the request. The resource credit indicates that the first remote computing node will not participate in completing the request. The one or more processors are further configured to release the resource on the first remote computing node, responsive to receiving the resource credit from the first remote computing node.

In yet another embodiment, a computer program product for early resource release in a symmetric multiprocessing system with cache coherence includes a computer readable storage medium having program instructions embodied therewith. The program instructions are executable by a processor to cause the processor to perform a method. The method includes detecting a cache miss for a cache line. A resource is reserved on each of one or more remote computing nodes, responsive to the cache miss. A request for a state of the cache line on the one or more remote computing nodes is broadcast to the one or more remote computing nodes, responsive to the cache miss. A resource credit is received from a first remote computing node of the one or more remote computing nodes, responsive to the request. The resource credit indicates that the first remote computing node will not participate in completing the request. The resource on the first remote computing node is released, responsive to receiving the resource credit from the first remote computing node.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure are coherency systems, methods, and computer program products, configured to achieve cache coherence across multiple computing nodes while also releasing resources unneeded for maintaining the cache coherence.

Figure 1:
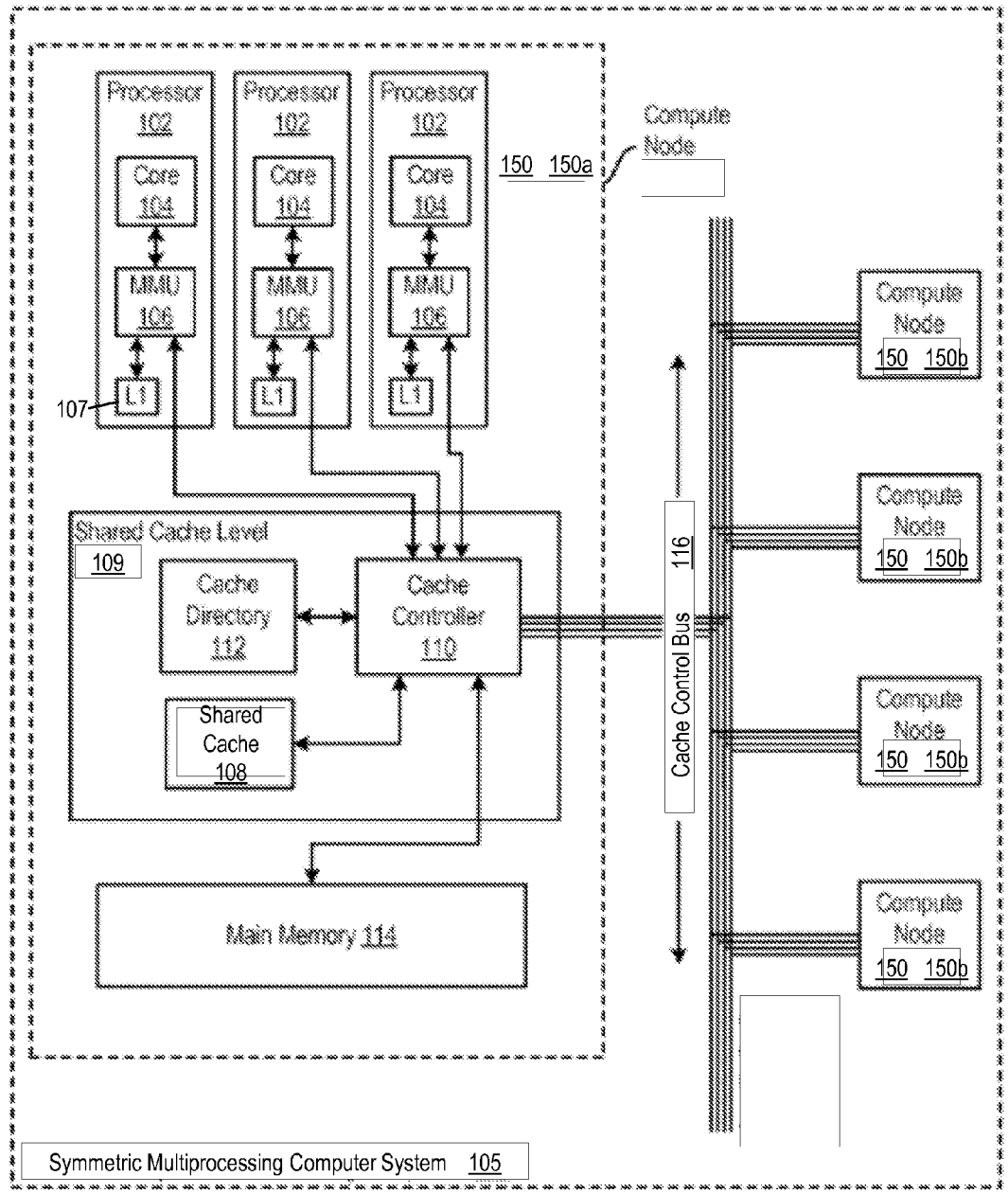
FIG. 1 is a block diagram of an example multi-node, symmetric multiprocessing (SMP) computer system with cache coherence, according to some embodiments of this disclosure.

FIG. 1 is a block diagram of a multi-node, symmetric multiprocessing (SMP) computer system 105 that maintains cache coherence according to a coherency system of this disclosure. As shown, the SMP computer system 105 may include two or more computing nodes 150. It will be understood that, although five computing nodes 150 are depicted in FIG. 1, various numbers of computing nodes 150 may be included in the SMP computer system 105. In FIG. 1, a local computing node 150a is expanded to illustrate some of its interior components, which may be the same as or similar to the components included in the other, remote computing nodes 150b.

It will be further understood that each of the computing nodes 150 may behave as the local computing node 150a or the remote computing nodes 150b as needed, when a computing node 150 experiences a cache miss as discussed below. For instance, when a first computing node 150 experiences a cache miss, it may behave as the local computing node 150a for the purpose of handling the cache miss.

A computing node 150 may include one or more computer processors 102. Although three processors 102 are depicted in FIG. 1, it will be understood that various numbers of processors 102 may be included for each computing node 150. Each processor 102 may have a core 140 coupled for memory operations to one or more caches and to main memory 114 through a memory management unit (MMU) 106 and a cache controller 110. The one or more caches may include an L1 cache 107 and a shared cache 108, which may be an L2 cache, for example. The MMU 106 may include address translation logic, a translation lookaside buffer, and controls for the L1 cache 107. The L1 cache 107 may be a relatively small, high-speed cache fabricated into the processor 102 itself. The cache controller 110, the shared cache 108, a cache directory 112, and a cache control bus 116, which may carry data communications between the computing nodes 150, may together implement a shared cache level 109 across the computing nodes 150.

The cache controller 110 may be a logic circuit that manages cache memory, providing an interface among the processors 102, the caches 107 and 108, and the main memory 114. Although the cache controller 110 is represented in FIG. 1 as being external to the processors 102, in some embodiments, each cache controller 110 may be integrated with a processor 102 or with an MMU 106.

As shown in FIG. 1, the shared cache 108 may be shared directly among the processors 102 on a single computing node 150 and indirectly among the processors 102 on other computing nodes 150. This sharing may be performed by a shared cache control bus 116 along with the cache controller 110 on each computing node 150.

The cache directory 112 may be a repository of information regarding cache lines in the caches 107 and 108. For each cache line in the caches 107 and 108 on the computing node 150, the cache directory 112 may record the identity of the cache line, i.e., the cache line tag, and the state of the cache line (e.g., MODIFIED, SHARED, INVALID). The MMUs 106 and the cache controller 110 of a computing node 150 may consult and update the information in the cache directory 112 with each cache operation on the computing node 150. In some embodiments, the cache controller 110 may be connected directly to the shared cache 108 but has no direct connection to the L1 cache 107, and may obtain information about cache lines in the L1 cache 107 from the cache directory 112.

The main memory 114 may be a random-access store of program data and program instructions for data processing on the SMP computer system 105. Although depicted by a single block, the main memory 114 may alternatively be segmented and distributed across the computing nodes 150. In some embodiments, the main memory 114 may be implemented in a single node, separate from the computing nodes 150 depicted and dedicated to the main memory 114.

It will be understood that other mechanisms for implementing the main memory 114 may also be used. Regardless of how the main memory 114 is implemented, cache access may generally be faster than accessing the main memory 114.

The caches 107 and 108 may be specialized segments of memory used by the processors 102 to reduce memory access latency. Each cache 107 and 108 may be smaller and faster than the main memory 114, and each cache 107 and 108 may store copies of data from frequently used main memory locations. When a processor 102 needs to read from or write to a location in main memory 114, the processor 102 may determine whether a copy of that data is in its L1 cache 107 or shared cache 108 in the form of a cache line. If a corresponding cache line is found, the processor 102 may read from or write to the cache 107 and 108 in which the cache line was found, which is generally faster than accessing main memory 114. Because main memory 114 is slower than the caches 107 and 108, cache misses may thus extract a heavy toll in memory access latency.

In some instances, the cache controller 110 on a local computing node 150a experiences a cache miss for a cache line in the shared cache 108, which may follow a cache miss on the L1 cache 107. If the SMP computer system 105 lacked cache coherence, the cache controller 110 on the local computing node 150a would have to retrieve the cache line from main memory 114, which would be undesirable with respect to memory latency.

However, in conventional SMP computer systems in which cache coherence is implemented across the computing nodes 150, the local computing node 150a may be able to acquire the desired cache line from a remote computing node 150b instead of having to access the cache. The local computing node 150a, such as by way of its cache controller 110, may reserve resources at the remote computing nodes 150b for handling the cache miss and resulting request for data. The cache controller 110 may broadcast to the remote computing nodes 150b a request for the cache line in question. The remote computing nodes 150b may use resources reserved for handling the broadcasted request and their responses to the request. Responsive to receiving the broadcasted request, each of the remote computing nodes 150b may broadcast to all other computing nodes 150 the state of its own cache line corresponding to the cache line requested. If at least one of the remote computing nodes 150b has a correct copy of the cache line, the local computing node 150a may thus receive the correct cache line due to these broadcasts.

Each computing node 150 may update the state of the cache line in question in one or more of its local caches 107 and 108, based on one or more of the states of the cache line in the other computing nodes 150. In some cases, updating the state of the cache line may include confirming that the current cache line state is correct in view of the information received from the other computing nodes 150. Thus, the update may, but need not, result in actually modifying the cache line in question.

Upon obtaining a correct copy of the cache line, the local computing node 150a may release the cache line for subsequent memory operations. Regardless of whether a correct copy of the cache line is identified through these broadcasts, in conventional systems, each of the remote computing nodes 150b may be required to confirm to the local computing node 150a that it has updated the state of its own cache line as needed, before the local computing node 150a is enabled to issue another broadcast for the same cache line. Thus, the local computing node 150a may be required to postpone further broadcasts requesting that cache line until all remote computing nodes 150b have confirmed that their corresponding cache lines are updated.

Thus, in response to each broadcast requesting a cache line in a conventional SMP computer system with cache coherence, each computing node 150 must have resources reserved to handle the broadcast. Further, in conventional systems, each remote computing node 150b sends two responses to each broadcast. In the first response, the remote computing node 150b sends the status of the cache line in question, and in the second response, the remote computing node 150b sends a confirmation that its cache line has been updated as needed.

To ensure that all of a local computing node's broadcasted requests for cache lines can be handled in a timely manner, conventional systems reserve on each remote computing node 150b the resources needed to handle the maximum number of requests that can be sent by the local computing node 150a. However, the reservation of these resources is expensive in terms of storage space and power requirements and, further, results in low utilization of resources on the remote computing nodes 150b.

According to some embodiments of this disclosure, when a request from a processor 102 misses in the caches 107 and 108 on a local computing node 150a, that local computing node 150a may reserve resources on the remote computing nodes 150b of the SMP computer system 105 and may broadcast a request to them. The remote computing nodes 150b may receive this request, and each may broadcast the state of the corresponding cache line on that remote computing node 150. According to some embodiments, each remote computing node 150b may additionally or alternatively broadcast, or transmit to the local computing node 150a, a resource credit in certain circumstances. More specifically, a remote computing node 150b may transmit a resource credit, instead of or in addition to the cache line status, if its cache controller 110 determines that it will not participate in the completion of the broadcasted request.

The determination that a remote computing node 150b will not participate may be made, for example, if the remote computing node 150b does not have a copy of the cache line in question; if the remote computing node 150b has a copy of the cache line but does not need to change its state due to the request; or if the remote computing node 150b has a copy of the cache line but will not provide cache line due to the request. For instance, if two remote computing nodes 150b have a copy of the requested cache line, then one may send a copy to the local computing node 150a, while the other may send a resource credit instead. In that case the remote computing node 150b that sends the resource credit need not update its cache state since it will still have a copy of the cache line after the request; thus, there is no need for that remote computing node 150b to participate.

The resource credit may take various forms. For example, and not by way of limitation, the resource credit may be a message or other indication that the remote computing node 150b will not participate in handling the broadcasted request for the cache line.

Upon receiving a resource credit from a remote computing node 150b, the local computing node 150a may release the reserved resources on that remote computing node 150b, thereby freeing those resources for other operations. As a result, each remote computing node 150b that transmits a resource credit may be required to respond to each broadcast request only a single time, indicating lack of participation, and need not respond a second time to indicate that it has updated its caches 107 and 108.

Figure 2:
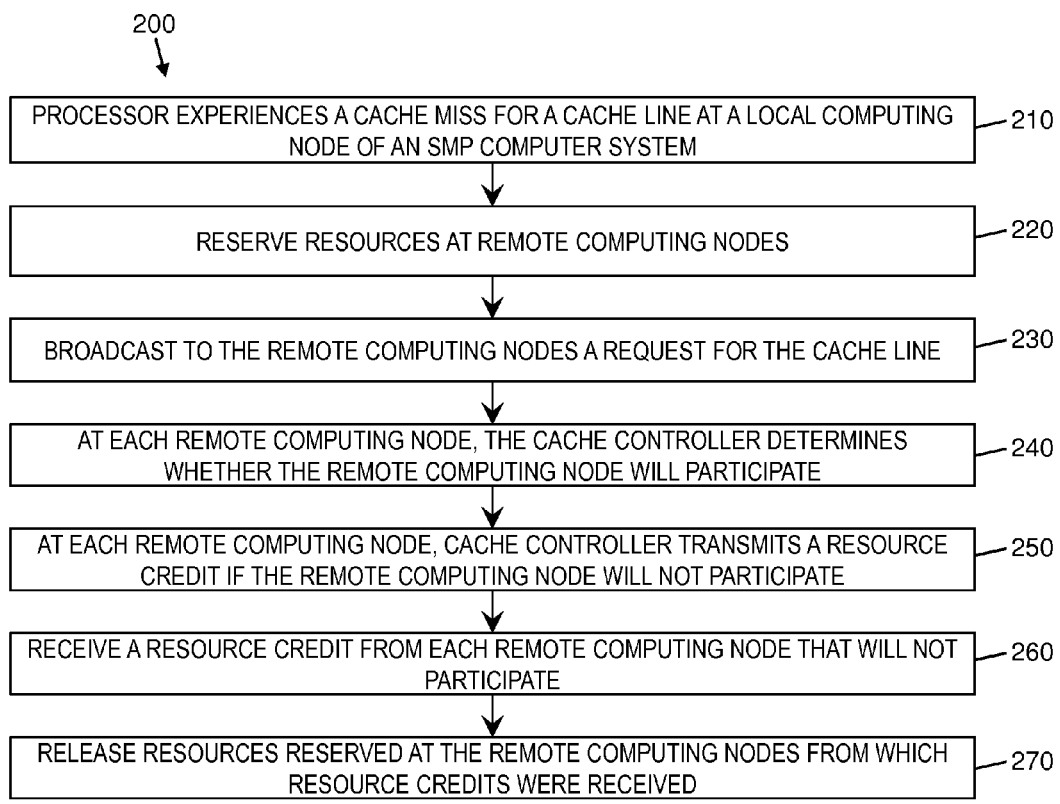
FIG. 2 is a flow diagram of a method for early shared resource release in an SMP computer system with cache coherence, according to some embodiments of this disclosure.

FIG. 2 is a flow diagram of a method for early shared resource release in an SMP computer system 105 with cache coherence, according to some embodiments of this disclosure. As shown, at block 210, a processor 102 at a local computing node 150a in the SMP computer system 105 experiences a cache miss for a cache line. Responsive to the cache miss, at block 220, the local computing node 150a may reserve resources on some or all remote computing nodes 150b of the SMP computer system 105. At block 230, the local computing node 150a may broadcast to the remote computing nodes 150b a request for the cache line. At block 240, at each remote computing node 150b, the cache controller 110 may determine whether the remote computing node 150b will participate in completing the request. At block 250, the cache controller 110 at each remote computing node 150b may transmit a resource credit to the local computing node 150a if that remote computing node 150b will not participate in completing the request. At block 260, the local computing node 150a may receive a resource credit from each remote computing node 150b not participating in completion of the request. At block 270, the local computing node 150a may release the reserved resources for handling the request at each remote computing node 150b from which a resource credit was received.

Figure 3:
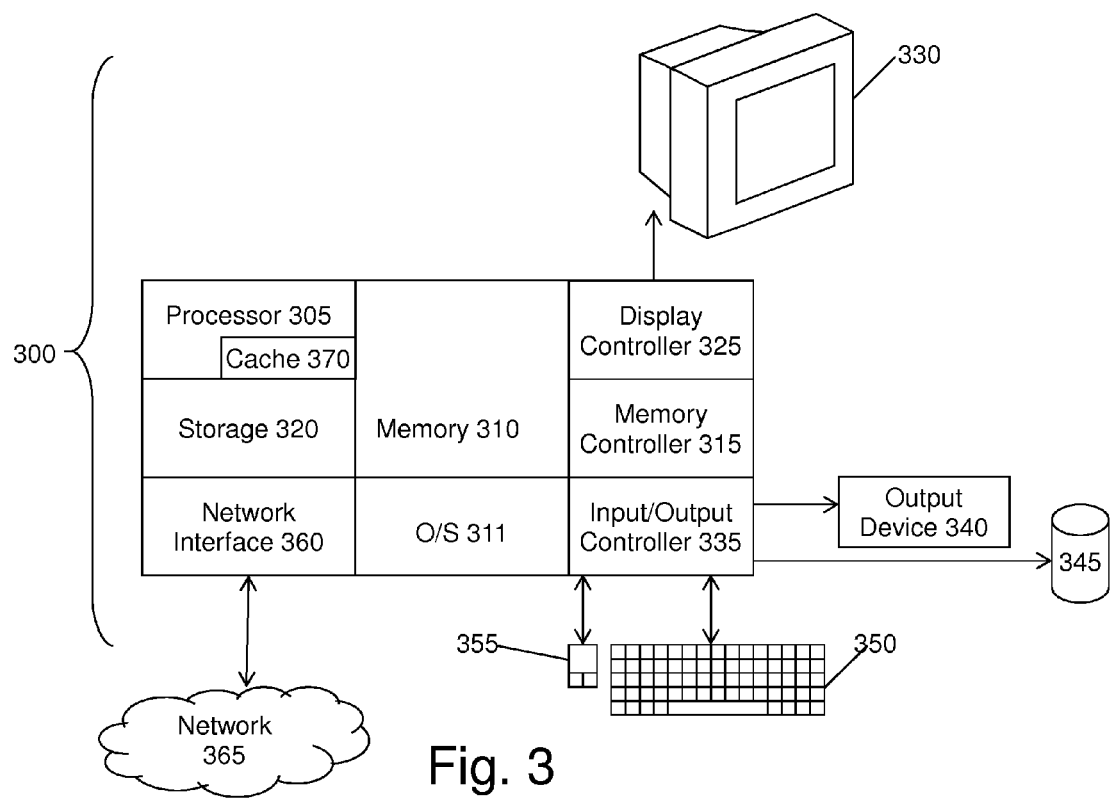
FIG. 3 is a block diagram of a computing device for implementing some or all aspects of the coherence system, according to some embodiments of this disclosure.

FIG. 3 illustrates a block diagram of a computer system 300 for use in implementing a coherency system or method according to some embodiments. The coherency systems and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer. More specifically, each computing node 150 depicted in FIG. 1 may be a computer system 300 such as the one shown in FIG. 3.

In some embodiments, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computer system 300, a semiconductor based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid state drive. The stored instructions in memory 310 or in storage 320 may include those enabling the processor to execute one or more aspects of the coherency systems and methods of this disclosure.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Coherency systems and methods according to this disclosure may be embodied, in whole or in part, in computer program products or in computer systems 300, such as that illustrated in FIG. 3.

Technical effects and benefits of some embodiments include the ability to maintain cache coherence across computing nodes of an SMP computer system 105, without maintaining a reservation of resources for remote computing nodes 150b known not be participating in requests for cache lines. As a result of some embodiments, resources may be freed on remote computing nodes 150b, thus increasing the utilization of those remote computing nodes 150b.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   detecting a cache miss for a cache line at a local computing node;
   reserving a resource on each of one or more remote computing nodes, the reserving responsive to the cache miss at the local computing node;
   broadcasting to the one or more remote computing nodes a request for a state of the cache line on the one or more remote computing nodes, the broadcasting responsive to the cache miss;
   wherein the resource reserved at each of the one or more remote computing devices enables the one or more remote computing devices to respond to the request for the state of the cache line;
   receiving, at the local computing node, responsive to the request, a resource credit from a first remote computing node of the one or more remote computing nodes, wherein the first remote computing node has a copy of the cache line, the resource credit indicating the first remote computing node will not participate in completing the request; and
   releasing the resource reserved on the first remote computing node, the releasing responsive to receiving the resource credit from the first remote computing node.

2. The method of claim 1, further comprising:
   determining, at the first remote computing node, that the first remote computing node will not participate in completing the request although the first remote computing node has a copy of the cache line; and sending the resource credit, by the first remote computing node, responsive to determining that the first remote computing node will not participate in completing the request.

3. The method of claim 2, wherein determining that the first remote computing node will not participate in completing the request comprises determining that a second remote computing node of the one or more remote computing nodes has a copy of the cache line.

4. The method of claim 1, further comprising:
receiving no resource credit from a second remote computing node of the one or more remote computing nodes, responsive to the request;
receiving a state of the cache line at the second remote computing node;
receiving confirmation that the second remote computing node updated the state of the cache line; and
postponing broadcasting a second request for a state of the cache line until the confirmation is received from the second remote computing node, responsive to receiving no resource credit from the second remote computing node.

5. The method of claim 4, further comprising:
determining, at the second remote computing node, that the second remote computing node will participate in completing the request; and
responsive to determining that the second computing node will participate in completing the request:
sending, by the second remote computing node, the state of the cache line at the second remote computing node; and
sending, by the second remote computing node, the confirmation that the second remote computing node updated the state of the cache line.

6. A system comprising:
a cache controller in communication with one or more remote computing nodes; and
one or more processors coupled to the cache controller and configured to:
detect a cache miss for a cache line at a local computing node;
reserve a resource on each of the one or more remote computing nodes, responsive to the cache miss at the local computing node;
broadcast to the one or more remote computing nodes a request for a state of the cache line on the one or more remote computing nodes, the broadcasting responsive to the cache miss;
wherein the resource reserved at each of the one or more remote computing devices enables the one or more remote computing devices to respond to the request for the state of the cache line;
receive, at the local computing node, responsive to the request, a resource credit from a first remote computing node of the one or more remote computing nodes, wherein the first remote computing node has a copy of the cache line, the resource credit indicating the first remote computing node will not participate in completing the request; and
release the resource reserved on the first remote computing node, the releasing responsive to receiving the resource credit from the first remote computing node.

7. The system of claim 6, the one or more processors further configured to:
determine, at the first remote computing node, that the first remote computing node will not participate in completing the request although the first remote computing node has a copy of the cache line; and
send the resource credit, by the first remote computing node, responsive to determining that the first remote computing node will not participate in completing the request.

8. The system of claim 7, wherein determining that the first remote computing node will not participate in completing the request comprises determining that a second remote computing node of the one or more remote computing nodes has a copy of the cache line.

9. The system of claim 6, the one or more processors further configured to:
receive no resource credit from a second remote computing node of the one or more remote computing nodes, responsive to the request;
receive a state of the cache line at the second remote computing node;
receive confirmation that the second remote computing node updated the state of the cache line; and
postpone broadcasting a second request for a state of the cache line until the confirmation is received from the second remote computing node, responsive to receiving no resource credit from the second remote computing node.

10. The system of claim 9, the one or more processors further configured to:
determine, at the second remote computing node, that the second remote computing node will participate in completing the request; and
responsive to determining that the second computing node will participate in completing the request:
send, by the second remote computing node, the state of the cache line at the second remote computing node; and
send, by the second remote computing node, the confirmation that the second remote computing node updated the state of the cache line.

11. A computer program product for early resource release in a symmetric multiprocessing system with cache coherence, the computer program product comprising a computer readable storage medium having program instructions embodied therewith, the program instructions executable by a processor to cause the processor to perform a method comprising:
detecting a cache miss for a cache line at a local computing node;
reserving a resource on each of one or more remote computing nodes, the reserving responsive to the cache miss at the local computing node;
broadcasting to the one or more remote computing nodes a request for a state of the cache line on the one or more remote computing nodes, the broadcasting responsive to the cache miss;
wherein the resource reserved at each of the one or more remote computing devices enables the one or more remote computing devices to respond to the request for the state of the cache line;
receiving, at the local computing node, responsive to the request, a resource credit from a first remote computing node of the one or more remote computing nodes, wherein the first remote computing node has a copy of the cache line, the resource credit indicating the first remote computing node will not participate in completing the request; and releasing the resource reserved on the first remote computing node, the releasing responsive to receiving the resource credit from the first remote computing node.

12. The computer program product of claim 11, the method further comprising:
   determining, at the first remote computing node, that the first remote computing node will not participate in completing the request although the first remote computing node has a copy of the cache line; and
   sending the resource credit, by the first remote computing node, responsive to determining that the first remote computing node will not participate in completing the request.

13. The computer program product of claim 12, wherein determining that the first remote computing node will not participate in completing the request comprises determining that a second remote computing node of the one or more computing nodes has a copy of the cache line.

14. The computer program product of claim 11, the method further comprising:
   receiving no resource credit from a second remote computing node of the one or more remote computing nodes, responsive to the request;
   receiving a state of the cache line at the second remote computing node;
   receiving confirmation that the second remote computing node updated the state of the cache line; and
   postponing broadcasting a second request for a state of the cache line until the confirmation is received from the second remote computing node, responsive to receiving no resource credit from the second remote computing node.

15. The computer program product of claim 14, the method further comprising:
   determining, at the second remote computing node, that the second remote computing node will participate in completing the request; and
   responsive to determining that the second computing node will participate in completing the request:
      sending, by the second remote computing node, the state of the cache line at the second remote computing node; and
      sending, by the second remote computing node, the confirmation that the second remote computing node updated the state of the cache line.

\* \* \* \* \*